(12) United States Patent
Sirat

(10) Patent No.: US 6,169,634 B1
(45) Date of Patent: Jan. 2, 2001

(54) ILLUMINATION TECHNIQUES FOR OVERCOMING SPECKLE ARTIFACTS IN METROLOGY APPLICATIONS

(75) Inventor: Gabriel Y. Sirat, Jerusalem (IL)

(73) Assignee: Optimet, Optical Metrology Ltd, Jerusalem (IL)

(*) Notice: Under 35 U.S.C. 154(b), the term of this patent shall be extended for 0 days.

(21) Appl. No.: 09/312,448

(22) Filed: May 14, 1999

Related U.S. Application Data

(60) Provisional application No. 60/088,500, filed on Jun. 8, 1998, and provisional application No. 60/097,383, filed on Aug. 21, 1998.

(51) Int. Cl.⁷ .................................................. G02B 27/30
(52) U.S. Cl. .................. 359/641; 359/572; 359/722; 359/317
(58) Field of Search .................................. 359/641, 317, 359/572; 353/722

(56) References Cited

U.S. PATENT DOCUMENTS

| | | | |
|---|---|---|---|
| 4,521,075 | 6/1985 | Obenschain et al. | 350/162.11 |
| 4,619,508 | * 10/1986 | Shibuya | 353/122 |
| 4,744,615 | 5/1988 | Fan et al. | 350/96.1 |

FOREIGN PATENT DOCUMENTS

| | | |
|---|---|---|
| 1 136 457 | 11/1982 | (CA). |
| WO 97/42891 | 11/1997 | (WO). |

OTHER PUBLICATIONS

Ripin, Barrett H., *Induced Spatial Incoherence Optical Delay Element*, Navy Technical Disclosure Bulletin, vol. 10, No. 4, Jun. 1985 (1985–06), pp. 25–32 XP002112467.

McKechnie, T.S., "Speckle Reduction", in Dainty, J.C., *Laser Speckle and Related Phenomena*, XP002112684, Chapter 4, pp. 123–170, Berlin (1975).

* cited by examiner

*Primary Examiner*—Georgia Epps
*Assistant Examiner*—Michael A Lucas
(74) *Attorney, Agent, or Firm*—Bromberg & Sunstein LLP

(57) ABSTRACT

A method and apparatus for converting a beam of light that is substantially coherent and has a coherence length into substantially incoherent radiation. The method has the steps of collimating the beam, delaying a first portion of the beam by a first optical delay by ballistic passage through a first cell of an optical element, and delaying each of a plurality of other portions of the beam by an optical delay different from the first optical delay by an amount exceeding the coherence length of the beam.

7 Claims, 2 Drawing Sheets

ILLUMINATION TECHNIQUES FOR OVERCOMING SPECKLE ARTIFACTS IN METROLOGY APPLICATIONS

The present application claims priority from U.S. Provisional Application Ser. No. 60/088,500, filed Jun. 8, 1998, and from U.S. Provisional Application Ser. No. 60/097,383, filed Aug. 21, 1998, which applications are herein incorporated by reference.

TECHNICAL FIELD

The present invention relates to optical metrology, and, in particular, to an apparatus and methods for reducing or eliminating speckle noise.

BACKGROUND ART

Noise levels in optical systems, whether directed toward imaging or measurement of an illuminated object or scene, are detrimentally affected by speckle. Speckle arises because of interference effects due to the coherence of the illuminating light. Light may reach a given detector element via multiple paths. If the light rays reaching the detector from two points on the surface of the illuminated scene bear a defined phase relationship with respect to one another, the detected intensity will be a function of that phase, increasing when the rays are in phase, and decreasing when the rays are out of phase. While useful in certain applications, speckling generally degrades imaging, adding a noise component which may approach the level of the signal itself.

Thus, in order to despeckle the illumination, it is useful to decohere any coherent light source. Various methods are known, including the use of a fiber optic multichannel array, as described in U.S. Pat. No. 5,029,975. A survey of known speckle reduction techniques is provided by T. S. McKechnie, "Speckle Reduction," in J. C. Dainty, ed., *Laser Speckle and Related Phenomena*, Springer, Berlin, 1975, pp. 123–170, which is incorporated herein by reference.

One example of a metrological application that may be adversely affected by speckle is that of conoscopy, a form of holography that may be practiced using incoherent light. In ordinary holography, coherent light emanating from a source region is caused to interfere with a coherent reference beam in order to construct an interferogram in which the characteristics of the source region in two or three dimensions are encoded. Conoscopy is a distinct interferometric technique capable of determining the distance to one or more points within an object volume without employing a reference beam. Instead, light emanating from a source region is prepared in a defined state of polarization and then passed through an anisotropic optical element in which one polarization suffers phase retardation with respect to the other. The two polarization components emerging from the anisotropic optical element interfere with one another, producing a interferogram in the detector plane. Conoscopy is the subject of various patents, including U.S. Pat. Nos. 4,602, 844, 4,976,504, 5,081,540, and 5,081,541. The source region may be illuminated with a grid (or "cloud") of points, or with a line. However interference effects attributable to the coherence of the source are detrimental to the sensitivity of the measurement technique.

Accordingly, for this and other metrological techniques, it is desirable to overcome speckle.

SUMMARY OF THE INVENTION

In accordance with a preferred embodiment of the present invention, there is provided a method for converting a beam of light that is substantially coherent and has a coherence length into substantially incoherent radiation. The method has the steps of:

a. collimating the beam for creating a substantially collimated beam;

b. delaying a first portion of the substantially collimated beam by a first optical delay by ballistic passage through a first cell of an optical element; and c. delaying each of a plurality of portions of the substantially collimated beam different from the first portion of the substantially collimated beam by an optical delay different from the first optical delay by an amount exceeding the coherence length of the beam. Additionally, the step of delaying may include directing the plurality of portions of the substantially collimated beam through an optic having a plurality of cells of mutually different effective optical length.

In accordance with an alternate embodiment of the invention, a method is provided for reducing speckle in reflection from a scene illuminated by a beam produced by a substantially coherent source of light. The method has the steps of directing the beam of light through a wedge module so as to illuminate the scene and detecting light reflected from the scene. The wedge module has a first optically anisotropic wedge, a second optically anisotropic wedge inclined relative to the first optically anisotropic wedge, and an optical compensation plate having an interface parallel to a face of the first optically anisotropic wedge and a face of the second optically anisotropic wedge so as to compensate any change in optical path of the beam of light.

BRIEF DESCRIPTION OF THE DRAWINGS

The foregoing features of the invention will be more readily understood by reference to the following detailed description taken with the accompanying drawings, in which.

DETAILED DESCRIPTION OF SPECIFIC EMBODIMENTS

Figure 1:
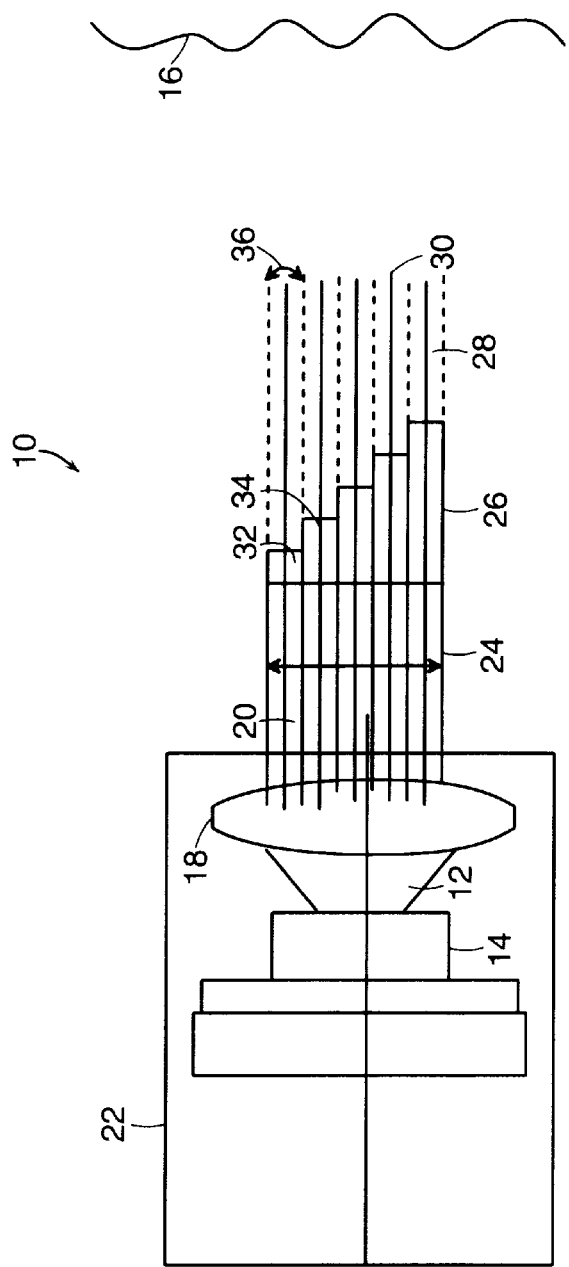
FIG. 1 is a diagram of an optical layout in cross section of a staircase illuminator for providing an illuminating beam of decreased spatial coherence in accordance with a preferred embodiment of the present invention.

A preferred embodiment of the invention is now described with reference to FIG. 1 wherein a diagram shows the optical layout of a staircase illuminator, designated generally by numeral 10, for providing an illuminating beam of decreased spatial coherence in accordance with a preferred embodiment of the present invention. The light output 12 of a light source, such as laser 14, is characterized by the degree of spatial coherence across the output beam and temporal coherence, the temporal width of an autocorrelation of the output beam. Equivalently, a coherent light source may be characterized by a coherence length equal to the temporal coherence times the speed of light in vacuo, where it is to be understood that the coherence length in a material medium is the vacuum coherence length scaled by the refractive index of the medium. Sources having very narrow bandwidths are characterized by higher temporal coherence (and larger coherence lengths) than broadband sources.

In order to illuminate object 16, beam 12 is collimated using collimating optics 18 to form a collimated beam 20. It is to be understood that application of the techniques described to sources of light of any degree of coherence is within the scope of the invention as claimed, although beam 20 is referred to herein as coherent. Collimating optics 18 may be a convex focusing lens, as shown, or any other collimating configuration of optical elements known to persons skilled in the optical arts. Generally, The terms "optic" and "optics" as used herein and in any amended claims refer to any appropriate optical module including any combination of transmissive and/or reflective optical elements as known to persons skilled in the optical arts. Collimating optics 18 are retained in a mechanical structure such as lens mount 22. Collimated beam is characterized by a beam aperture 24.

In order to decohere collimated beam 20 before it is incident on object 16, a differential optical delay optic 26 is interposed between collimating optic 18 and object 16. The optical delay of light through a medium is equal to $\int n(l) \, dl$, where n(l) is the refractive index of the medium which may vary along the axis of propagation of the light through the medium, and l denotes the propagation path of the light through the medium. For air, n=1, whereas, in an immersion application, the refractive index of the ambient medium may be other than unity, requiring the differential optical delay to be adjusted in accordance with the index of the ambient medium. If the index of refraction of the light is constant, the optical delay simply equals the product of the propagation length through the medium times the index of refraction of the medium. If a differential optical delay is introduced between two (or more) portions of the beam such that the optical delay exceeds the coherence length of the beam, the light emerging from application of the differential optical delay may be characterized as sunbeams 28 and 30 which lack coherence with respect to each other. In preferred embodiments of the invention, optical delay is introduced among sunbeams 28 and 30 without substantial reflection of light in each subbeam, in a manner referred to as "ballistic" delay. Thus, sunbeams 28 and 30 are not transmitted through separate waveguides, and any reflection of light, such as at interfaces between media of disparate indices of refraction, is only incidental.

In particular, differential optical delay optic 26 may be a staircase optic. A staircase optic, as used in this description and in any appended claims, refers to a transparent medium having substantially parallel input and output faces, such that the distance between the parallel input and output faces is a function of position in a plane parallel to the faces. Thus, a substantially collimated beam of light incident on a staircase optic will suffer optical retardation that is a function of a position within the beam transverse to the propagation direction. "Transparent," as used herein, means having substantial optical transmission at those wavelengths at which illumination of the scene or object 16 is intended. The selection of optical materials and the fabrication of optics is known in the optical arts.

The differential optical delay introduced into beam 20 for creating mutually incoherent sunbeams 28 and 30 is not limited to physical path length differences but may include differences of refractive index, introduced into differential optical delay optic 26 by assembly, or coating, or doping, or implantation of materials, or in any other manner. Differential optical delay optic 26 is substantially transparent at the wavelength of illumination, and has an index of refraction which differs from the index of refraction of the ambient propagation medium (typically air). After traversal of staircase 26, beam 20 may be characterized as an array of sunbeams 28 and 30, each subbeam having traversed an element (or "cell," or "region") 32 of staircase 26.

Figure 2:
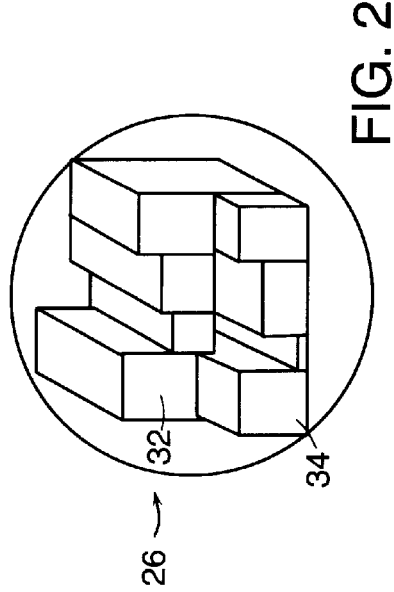
FIG. 2 is an end view of an optical staircase from an end facing an illuminated object in accordance with the embodiment of FIG. 1.

Elements 32 and 34 of staircase 26 are shown in FIG. 2 which depicts an end view of staircase 26 from the end facing object 16. Elements 32 and 34 of staircase 26 have output faces that lie in parallel planes. While shown as having substantially rectilinear edges, the shape of each of elements 32 and 34 is a matter of design choice, and all such shapes are within the scope of the invention as claimed in the appended claims.

Referring again to FIG. 1, beam 20, after passage through differential optical delay optic 26, is now effectively a plurality of mutually incoherent sunbeams 28 and 30, wherein, in illuminating scene or object 16, each of sunbeams 28 and 30 is characterized by a respective subaperture 36 which is smaller than original aperture 24 of beam 20.

Figure 3:
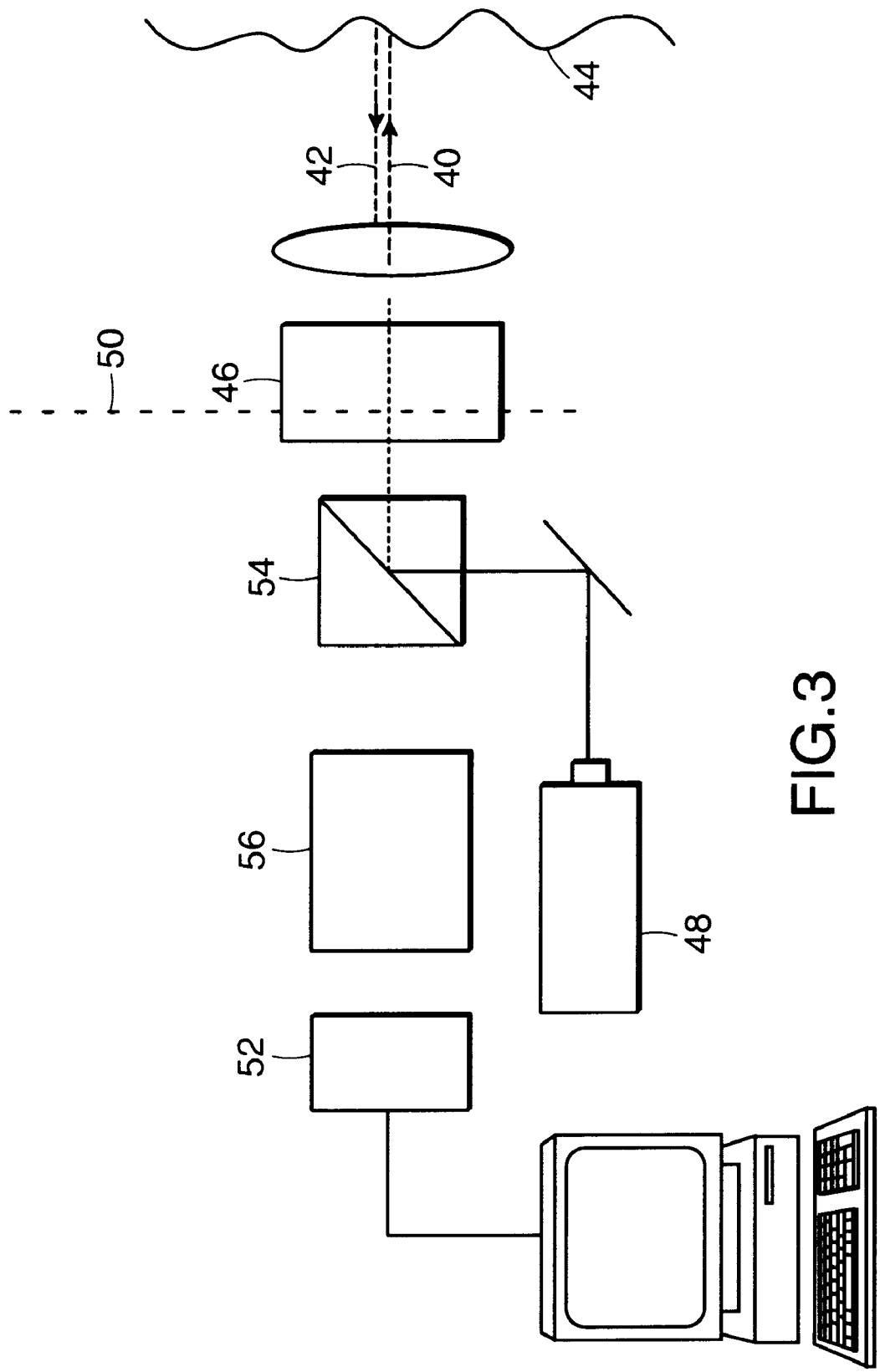
FIG. 3 is a diagram of an optical layout in cross section of a wedge illuminator for providing an illuminating beam of decreased spatial coherence in accordance with an alternate embodiment of the present invention.

Referring now to FIG. 3, use may also be made, in accordance with a further embodiment of the present invention, of the fact, well known to persons skilled in the optical arts, that speckle from two orthogonal polarizations of incoming light are uncorrelated as are also the speckles from two orthogonal polarizations of reflected light. A projected beam 40 of light and a beam 42 of light reflected from object, scene, or surface 44 are passed through a multiple waveplate 46 consisting of a wedge of a uniaxial crystal, placed at an aperture plane or close to it. Several different mechanisms of speckle reduction are thus implemented in a single element.

A source 48 of light, in accordance with a preferred embodiment of the invention, is a laser having a high modal contents such as, for example, a commercially available laser having a bandwidth on the order of 1 nm. As known to persons skilled in the optical arts, if the waveplate count, i.e., the number of waves at a given wavelength that the ordinary ray is retarded in the medium relative to the extraordinary ray, is higher then the spectral resolution of the laser, then the radiation of the laser is split, by waveplate 46, into different wavelength regions with different speckle behavior. For example, for a 1-nm spectral bandwidth for a 685 nm laser, a calcite plate of 6 mm will have a difference of 2.17 waves between the lowest and highest spectral wavelengths and will separate them into almost 5 different bands, each band behaving distinctly from speckle point of view. This effect occurs twice in the system, once on the path 40 of projection and once on path 42 of reflection.

Because of the wedged properties of waveplate 46, light 40 and 42 experience different polarization states depending on lateral position in aperture plane 50, even in the case of completely monochromatic light. This effect, as well, occurs twice in the system, once on the path 40 of projection and once on path 42 of reflection. In order to avoid any optical path change and any double refraction effect, wedge 46 is split in two and compensated optically by a glass plate, as known to persons skilled in the optical arts, creating a module which consists optically of two planar plates inclined one relative to the other. Reflected light 42 is coupled to optical detector 52, via polarizing beam splitter 54 and anisotropic crystal 56. Optical detector 52 is shown by way of example, without limitation, although reflected light 42 may be any component or system for imaging or measurement of an illuminated object or scene The described embodiments of the inventions are intended to be merely exemplary and numerous variations and modifications will be apparent to those skilled in the art. All such variations and modifications are intended to be within the scope of the present invention as defined in the appended claims.

What is claimed is:

1. A method for converting a beam of light that is substantially coherent, the beam of light having a coherence length, into substantially incoherent radiation, the method comprising:

a. collimating the beam for creating a substantially collimated stationary beam;

b. delaying a first portion of the substantially collimated beam by a first optical delay by ballistic passage through a first cell of an optical element; and c. delaying each of a plurality of portions of the substantially collimated stationary beam different from the first portion of the substantially collimated beam by an optical delay different from the first optical delay by an amount exceeding the coherence length of the beam.

2. A method for reducing speckle in reflection from a scene illuminated by a beam produced by a substantially coherent source of light, the method comprising:

a. collimating the beam for creating a substantially collimated stationary beam; and b. directing the substantially collimated stationary beam through a staircase optical element such as to illuminate the scene.

3. A method for reducing speckle in reflection from a scene illuminated by a beam produced by a substantially coherent source of light, the method comprising:

a. collimating the beam for creating a substantially collimated stationary beam; and b. directing the substantially collimated stationary beam through a staircase optical element such as to illuminate the scene.

4. An apparatus for illuminating a scene with incoherent radiation, the apparatus comprising:

a. an input for receiving a physically stationary beam of radiation having a coherence length; and b. a differential optical delay optic for differentially and ballistically retarding a plurality of portions of the beam with respect to one another by differential delays greater than the coherence length of the coherent radiation.

5. An illuminating apparatus according to claim 4, wherein the differential optical delay optic is a staircase optic.

6. An illuminating apparatus according to claim 4, further comprising a collimator for forming the beam of radiation into a substantially collimated beam prior to passage of the radiation through the differential optical delay optic.

7. A method for reducing speckle in reflection from a scene illuminated by a beam produced by a substantially coherent source of light, the method comprising:

a. directing the beam through a wedge module so as to illuminate the scene; the wedge module including:
      i. a first optically anisotropic wedge;
      ii. a second optically anisotropic wedge inclined relative to the first optically anisotropic wedge; and
      iii. an optical compensation plate having an interface parallel to a face of the first optically anisotropic wedge and a face of the second optically anisotropic wedge so as to compensate any change in optical path of the beam of light; and b. detecting light reflected from the scene illuminated by the beam of light.

* * * * *